United States Patent [19]
Ravilious et al.

[11] Patent Number: 5,503,175
[45] Date of Patent: Apr. 2, 1996

[54] WATER SAFETY SYSTEM

[76] Inventors: Paul W. Ravilious, 14 Walnut La.;
David C. H. Grant, One Walnut La.,
both of Selbyville, Del. 19975

[21] Appl. No.: 361,541

[22] Filed: Dec. 22, 1994

[51] Int. Cl.⁶ .............................. F16K 17/00; F16K 21/16
[52] U.S. Cl. .......................... 137/1; 137/456; 137/460;
137/624.12; 200/81.9 M
[58] Field of Search ................................ 137/1, 456, 459,
137/460, 624.11, 624.12; 200/81.9 M

[56]  References Cited

U.S. PATENT DOCUMENTS

| | | |
|---|---|---|
| 389,096 | 9/1888 | Newman . |
| 2,419,942 | 5/1947 | Brewer . |
| 2,791,657 | 5/1957 | Bloxsom et al. ............... 200/81.9 M |
| 3,057,977 | 10/1962 | Caswell . |
| 3,200,637 | 8/1965 | Ballou et al. . |
| 3,247,499 | 4/1966 | Dumpleton et al. . |
| 3,324,458 | 6/1967 | MacArthur . |
| 3,369,561 | 2/1968 | Zimmerman et al. . |
| 3,416,560 | 12/1968 | Bruno ................................. 137/456 |
| 3,446,986 | 5/1969 | Cox ................................. 200/81.9 M |
| 3,555,901 | 1/1971 | Delatorre et al. . |
| 3,726,296 | 4/1973 | Friedland et al. . |
| 3,812,872 | 5/1974 | Block et al. . |
| 4,093,871 | 6/1978 | Plumb et al. . |
| 4,134,423 | 1/1979 | Mayer . |
| 4,180,088 | 12/1979 | Mallett ............................. 137/459 X |
| 4,238,825 | 12/1980 | Geery . |
| 4,244,396 | 1/1981 | Friedland et al. . |
| 4,249,565 | 2/1981 | Brust ............................. 137/624.11 X |
| 4,304,989 | 12/1981 | Vos et al. . |
| 4,333,486 | 6/1982 | Ciccozzi . |
| 4,589,435 | 5/1986 | Aldrich ............................. 137/456 X |
| 4,663,977 | 5/1987 | VanderHeyden . |
| 4,672,990 | 6/1987 | Robillard . |
| 4,705,060 | 11/1987 | Goulbourne . |
| 4,730,637 | 3/1988 | White . |
| 4,807,661 | 2/1989 | Lewis ............................. 137/456 |
| 4,813,443 | 3/1989 | Pounder . |
| 4,816,987 | 3/1989 | Brooks et al. . |
| 4,888,706 | 12/1989 | Rush et al. . |
| 4,921,209 | 5/1990 | Moineau . |
| 4,926,901 | 5/1990 | Waltenburg ........................ 137/456 |
| 4,942,758 | 7/1990 | Cofield . |
| 5,019,678 | 5/1991 | Templeton et al. . |
| 5,038,820 | 8/1991 | Ames et al. ..................... 137/460 X |
| 5,056,554 | 10/1991 | White . |

FOREIGN PATENT DOCUMENTS

| | | |
|---|---|---|
| 931043 | 7/1973 | Canada . |
| 46777 | 8/1939 | Netherlands . |
| 2074640 | 11/1981 | United Kingdom . |
| 2117436 | 10/1983 | United Kingdom . |

OTHER PUBLICATIONS

Fluid–Gard Incorporated (Solid State System for Fluid Control) Introducing Your Best Defense Against Interior Water Damage. (undated).

*Primary Examiner*—Robert G. Nilson
*Attorney, Agent, or Firm*—Shlesinger Arkwright & Garvey

[57]  ABSTRACT

A water safety valve, system and method for detecting and shutting off water flow due to leaks or breaks in a water line in which the water flow is at a very low rate on the order of three to five fluid ounces per minute but having the capability of passing large flows of three hundred to five hundred times this amount. The system provides an automatic fluid shut off with an over-ride timer with an automatic return to normal operation when a predetermined period has expired. It further allows simple shut off and activation of the system with a single conveniently located control.

26 Claims, 6 Drawing Sheets

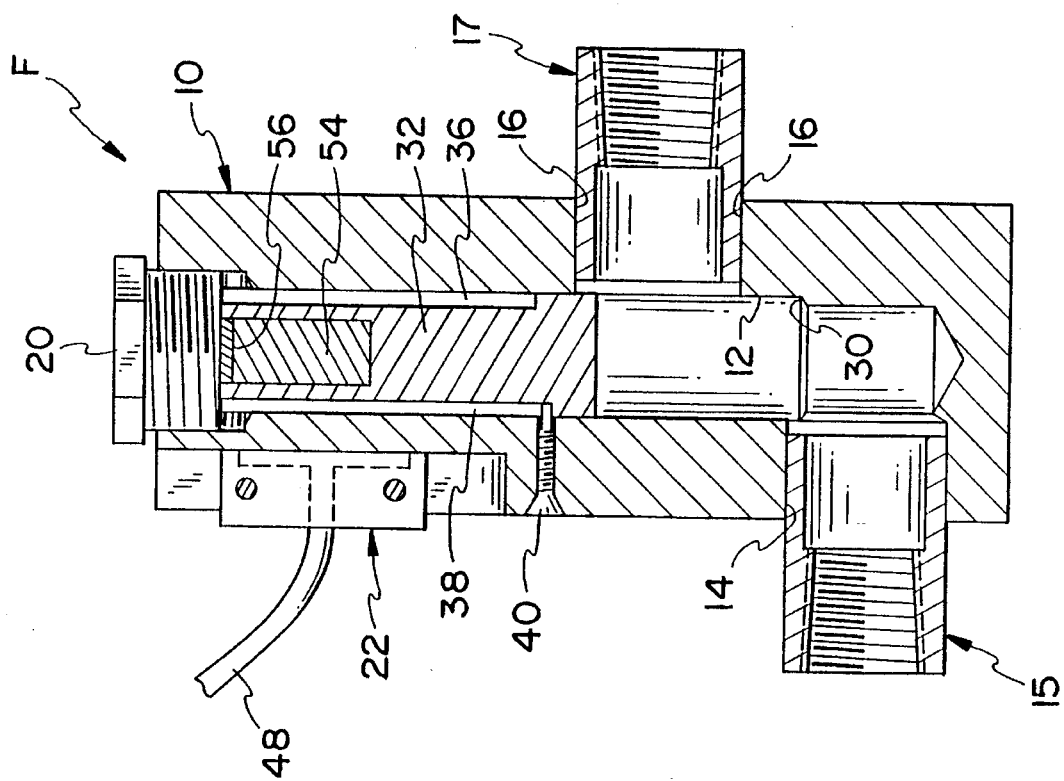
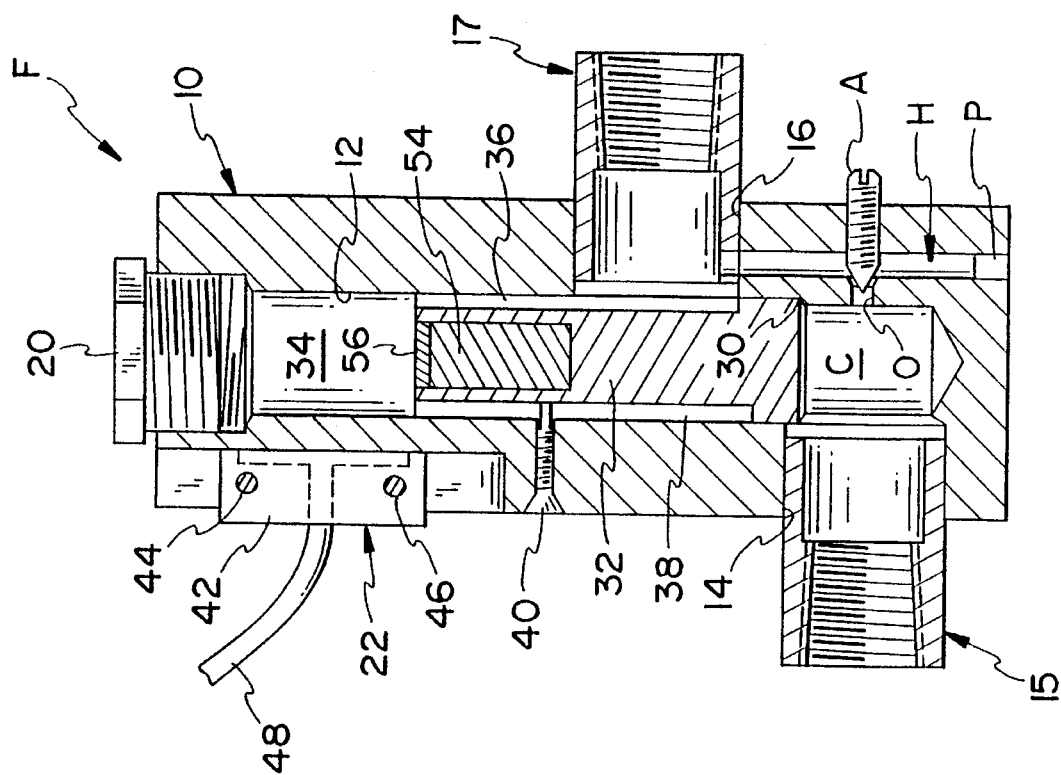
FIG. 3
FIG. 4

WATER SAFETY SYSTEM

WATER SAFETY SYSTEM

The present invention relates generally to a fluid shutoff system. More specifically, to an automatic fluid shutoff system having a piston type flow detector.

BACKGROUND OF THE INVENTION

Residential and commercial building owners are faced with the potential great water damage as a result of leaks in their plumbing systems. These leaks result from a number of causes, such as faulty or failed equipment and frozen pipes. This problem is especially acute when the property owner does not visit the building frequently as is often the case with rental property or vacation homes. For example, in Ocean City, Md., during a week long freeze in January of 1994, 345 broken pipes were reported to the Ocean City water department. Further, as a result of the same freeze, there was more than $14 million in damage reported to Maryland's top property insurers, most of which was for damage caused by frozen water pipes. Therefore the need for detecting leaks in plumbing systems and responding by shutting off the water flow can be greatly appreciated.

There are a number of automatic shutoff systems commercially available, however many of them rely on some form of moisture detection that requires the detector to be physically located where discharged water will accumulate. As a result much water damage can occur when a leak occurs in a remote area from the detector, such as an attic.

Another problem with the commercial systems is that they have limited flow span, (a ratio of the maximum flow through the device to the minimum flow detectable), and therefore have a problem detecting very low flow rates. Over a period of time, even small leaks may cause extensive damage.

Further, commercial systems do not have flow detectors with a high flow ratio, i.e. capable of detecting very low flow rates, on the order of 3–5 fluid ounces per minute while also being capable of passing large flows, 300–500 times the lowest flow, or 7–12 gallons per minute.

Another problem encountered with commercial fluid detectors with sensitivity to low flow, is that because of the sensitivity of the detector the minimum detection limit could be too low causing unwanted flow detection signals. Therefore, an adjustable low flow detection limit is needed. For example, if a bathroom commode had a slight leak and it would be inconvenient to fix it at a particular moment, one could adjust the low detection limit to a higher level to retain the safety function of the system and yet accommodate some temporary situation.

OBJECTS AND SUMMARY OF THE INVENTION

It is therefore an object of the present invention to provide an effective low flow rate flow detector in an automatic fluid shutoff system.

It is another object of the present invention to provide an automatic fluid shutoff system which can be installed at the water supply and does not need to be located at the point of the water leak to operate.

It is another object of the present invention to provide an effective flow detector capable of detecting water flow as low as three fluid ounces per minute which is not available with other prior art devices.

It is another object of the present invention to provide an effective flow detector capable of detecting water flow as low as 3 fluid ounces per minute while also being capable of passing large water flows 300 to 500 times the minimum flow detection rate or 7 to 12 gallons per minute.

It is yet another object of the present invention to provide an effective flow detector with a one piece integral housing for low cost manufacture.

It is another object of the present invention to provide an effect flow detector with adjustable low flow detection limit allowing the changing of the minimum detection limit and thereby avoiding unwanted flow detection signals.

It is still another object of the present invention to provide an automatic fluid shutoff system with a delay timer for allowing water flow for a preselected period of time prior to shutting off the water flow which permits normal use of items such as dish washers, showers, toilets and faucets, without unsolicited shutoff.

It is yet another object of the present invention to provide an automatic fluid shutoff system with an override timer for allowing extended periods of water to flow for a predetermined period of time and automatically returning to normal operation mode when the predetermined period has expired.

It is another object of the present invention to provide an automatic fluid shutoff system which allows simple shutoff and activation of the system with a single, conveniently located control.

It is a further object of the present invention to provide an automatic fluid shutoff system with conveniently located controls, such as switches and indicator lights, remote from the system.

It is an object of the present invention to provide an automatic fluid shutoff system which can be easily installed and easily removed from the water line.

It is still further another object of the present invention to provide an automatic fluid shutoff system installed in parallel with a by-pass water line.

In summary, the present invention is directed to a water safety valve for detecting water flow due to leaks or breaks in a water line and particularly low water flow.

These and other objects and advantages of the present invention will become apparent from a consideration of the following detailed description taken in conjunction with the accompanying drawings.

BRIEF DESCRIPTIONS OF THE DRAWINGS

FIG. 3 is a vertical section an alternative embodiment of the flow detector taken along lines 3—3 of FIG. 1 with the piston in a first lower position and a fluid bypass in the housing, the switch has been rotated 90 degrees for convenience;

FIG. 4 illustrates in cross section, the flow detector as shown in FIG. 3 without the fluid bypass in the housing and with the piston in a second upper position;

DETAILED DESCRIPTION OF THE INVENTION

THE FLOW DETECTOR

Figure 2:
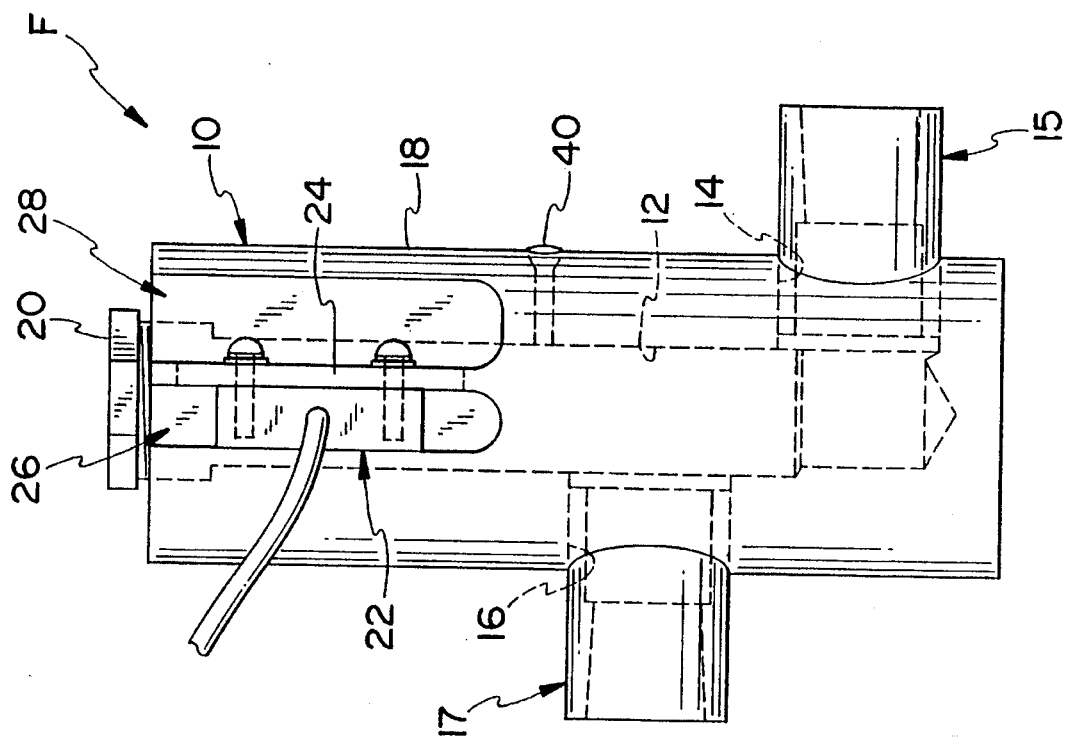
FIG. 2 is a side elevational view of the flow detector of the present invention shown in FIG. 1 with hidden portions shown in phantom lines.
Figure 1:
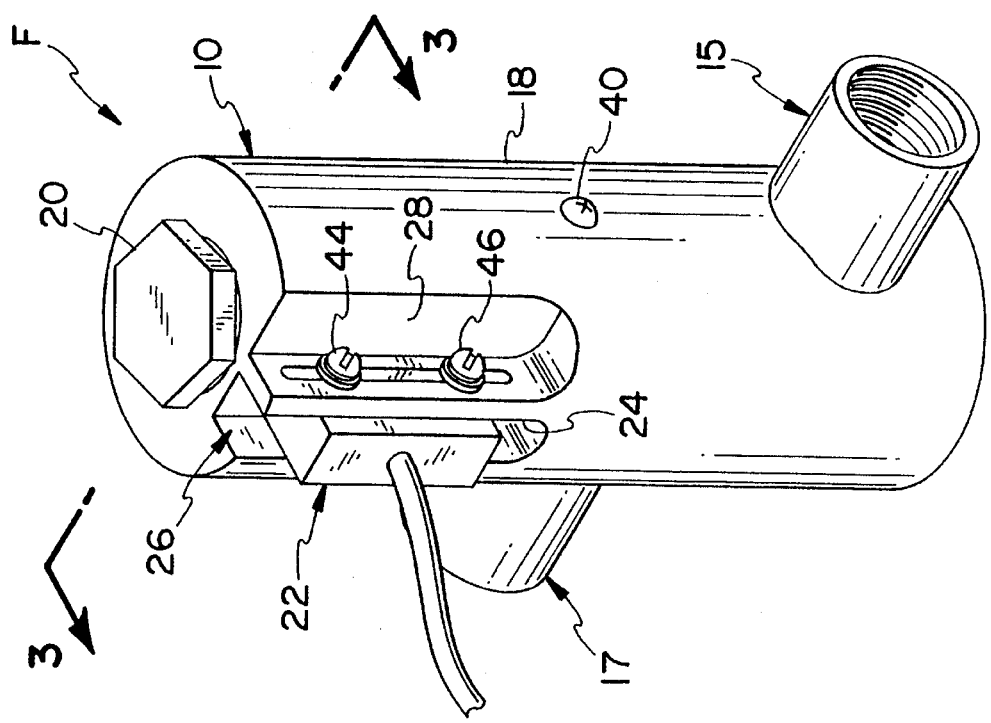
FIG. 1 is a perspective view of the flow detector of the present invention.

Shown in FIGS. 1 and 2 is the preferred embodiment of the flow detector F of the present invention. Flow detector F comprises a generally cylindrical one piece integral housing 10, made of PVC or any non magnetic material capable of handling fluid flow, with a bore 12 opening at the top of housing 10 and stopping a short distance from the bottom of the housing 10.

Inlet port 14 and outlet port 16 extend through the side wall 18 of housing 10 and open into bore 12. Inlet port 14 and outlet port 16 may be positioned 0–180 degrees apart, with outlet port 18 positioned above inlet port 14. Inlet port 14 is sized to be coupled with a fitting 15 which is connected to conduit from a water or other fluid supply (not shown), and outlet port 16 is sized to be coupled with a fitting 17 which is connected to conduit for supplying water or fluid to the user (not shown).

The inlet port 14 may be positioned at the bottom of the housing 10 (not shown) rather than at the side as illustrated in FIGS. 1–5.

Removable plug 20 is used to seal bore 12 at the top of housing 10 which allows for easy maintenance of the interior of flow detector F. A switch assembly 22 is movably mounted to divider 24, which separates groves 26 and 28 in side wall 18. For ease in assembly and manufacture, this configuration allows the switch assembly 22 to be securely attached without distorting or altering the shape of the bore 12.

Referring to FIGS. 3 and 4, bore 12 is generally of uniform diameter from the top of housing 10 to the top of the opening of inlet port 14, where the diameter of bore 12 is slightly reduced creating a lip or stop 30.

A cylindrical piston 32 is slidably disposed within bore 12 forming a chamber 34 between the top of piston 32 and plug 20. Piston 32 preferably is made of a generally non-corrosive material such as brass.

The diameter of piston 32 should be such that piston 32 can be readily displaced in bore 12 from a first position, where piston 32 is resting on stop 30 (FIG. 3), to a second position up towards the top of housing 10 (FIG. 4).

The optimum diametral clearance between piston 32 and bore 12 should be between about 0.003 inches and 0.006 inches. This preferred clearance allows free movement of piston 32 upward due to water pressure and free movement of piston 32 down by gravity when water flow stops while providing detection of leaks as small as 3 fluid ounces per minute.

Figure 7:
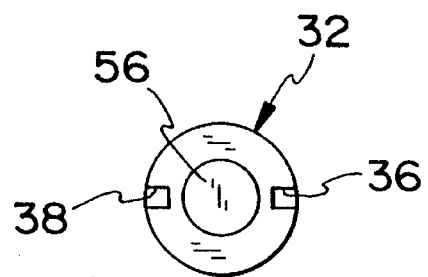
FIG. 7 is a plan view of the piston of the present invention.

As best shown in FIG. 7, piston 32 includes two slots 36 and 38 positioned at 180 degrees from each other. Slot 36 permits water to flow from chamber 34 to outlet port 16 when piston 32 is moved from its first position (FIG. 3) to its second position (FIG. 4).

Figure 5:
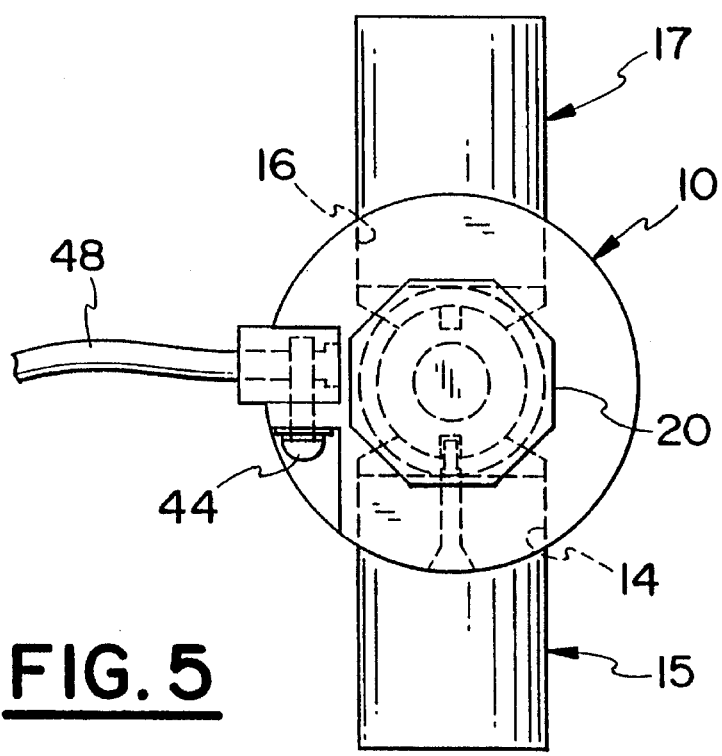
FIG. 5 is a plan view of the flow detector of the present invention shown in FIG. 1 with portions hidden shown in phantom lines.

As best shown in FIGS. 3, 4 & 5, pin 40 engages slot 38, which is inserted through side wall 18. This prevents piston from rotating within bore 12 and keeps slot 36 in alignment with outlet port 16.

Switch assembly 22 comprises a casing 42 movably connected to divider 24 with screws 44 and 46. By adjusting switch assembly 22 up on divider 24, the amount of flow needed to actuate switch assembly 22 is increased, and likewise by adjusting switch assembly 22 down on divider 24, the amount of flow needed to actuate switch assembly 22 is decreased.

Figure 6:
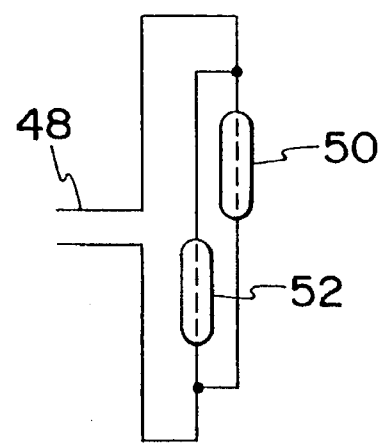
FIG. 6 is a side elevation view of the reed switches of the present invention.

Within casing 42 is wire 48 connected to a pair of magnetically operated reed switches 50 and 52 (see FIG. 6). Reed switches 50 and 52 are closely connected, generally within a few millimeters, and positioned in a parallel configuration with one above the other (see FIG. 6). This eliminates any dead space where reed switches 50 and 52 might not properly operate.

Other switches are contemplated to be within the scope of the present invention, such as a single reed switch or as disclosed in Cox, U.S. Pat. No. 3,446,986, a ferrous plug instead of magnet 54 can be used to operate the switch.

Within the upper portion of piston 32 is a magnet 54 which is sealed in place with an epoxy plug 56 for activating reed switches 50 and 52.

ALTERNATE EMBODIMENT OF THE FLOW DETECTOR

An alternate embodiment of flow detector F is shown in FIG. 3. Chamber C, which is formed in bore 12 below piston 32 when at rest on stop 30, is fluidly connected to outlet port 16 by bypass H. A needle valve or adjustment screw A is inserted into side wall 18 and extends into opening 0 of bypass H. Plug P is inserted into bypass H at the base of housing 10. This embodiment allows reduction of flow detection sensitivity of flow detector F.

OPERATION OF FLOW DETECTOR

In operation, flow detector F, illustrated in FIGS. 1–4, should be vertically mounted so that when there is no water flow through flow detector F, gravity effects piston 32 to a position on stop 30 (FIG. 3). When water flow as small a 3 liquid ounces per minute occurs in the water line, water enters bore 12 from inlet port 14.

Pressure rises to force piston 32 toward the top of housing 10 until the bottom edge of piston 32 reaches the outlet port 16 at which time water may pass through the valve.

Piston 32 is displaced further upward in proportion to water flow volume. As piston 32 rises, the magnetic field of magnet 54 closes the contacts of reed switches 50 and 52. The length and strength of magnet 54 is such that reed switches 50 and 52 remain closed during the entire distance of upward travel of piston 32 until it is stopped by plug 20 (FIGS. 3 & 4).

As piston 32 moves upward, water is displaced from chamber 34 through piston slot 36 to outlet port 16. Piston slot 36 runs from the top of piston 32 to a distance such that piston slot 36 will be in substantial communication with outlet port 16. Neither of piston slots 36 and 38 allow communication of inlet port 14 with outlet port 16.

Piston 32 will move upward until the bottom of piston 32 is adjacent to the top of outlet port 16. Any fluid remaining in chamber 34 will be escape from chamber 34 through the clearance between piston 32 and bore 12. This opens bore 12 between inlet port 14 and outlet port 16 thereby allowing for a large volume of fluid flow through flow detector F.

When water flow stops, gravity returns piston 32 to its lowest position and the contacts of reed switches 50 and 52 open.

Referring now to the operation of the alternative embodiment of FIG. 3, in order to reduce flow detection sensitivity, flow is allowed to bypass piston 32. The flow originates in chamber C, passes into bypass H through opening 0, past adjustment screw A, and into outlet port 16. Depending on external condition, there will be a pressure drop across clearance between housing 10 and the tip of the adjustment screw A. When flow is sufficient that the pressure drop produces a force on the bottom of piston 32, the flow detector F will operate as described above.

The adjustment screw A can be adjusted to vary the clearance between housing 10 and the tip of adjustment screw A, thereby also, given the same external conditions, varying the pressure imposed on piston 32. If adjustment screw A is closed completely, the flow detector F will operate as described above with maximum sensitivity.

THE SYSTEM

Figure 8:
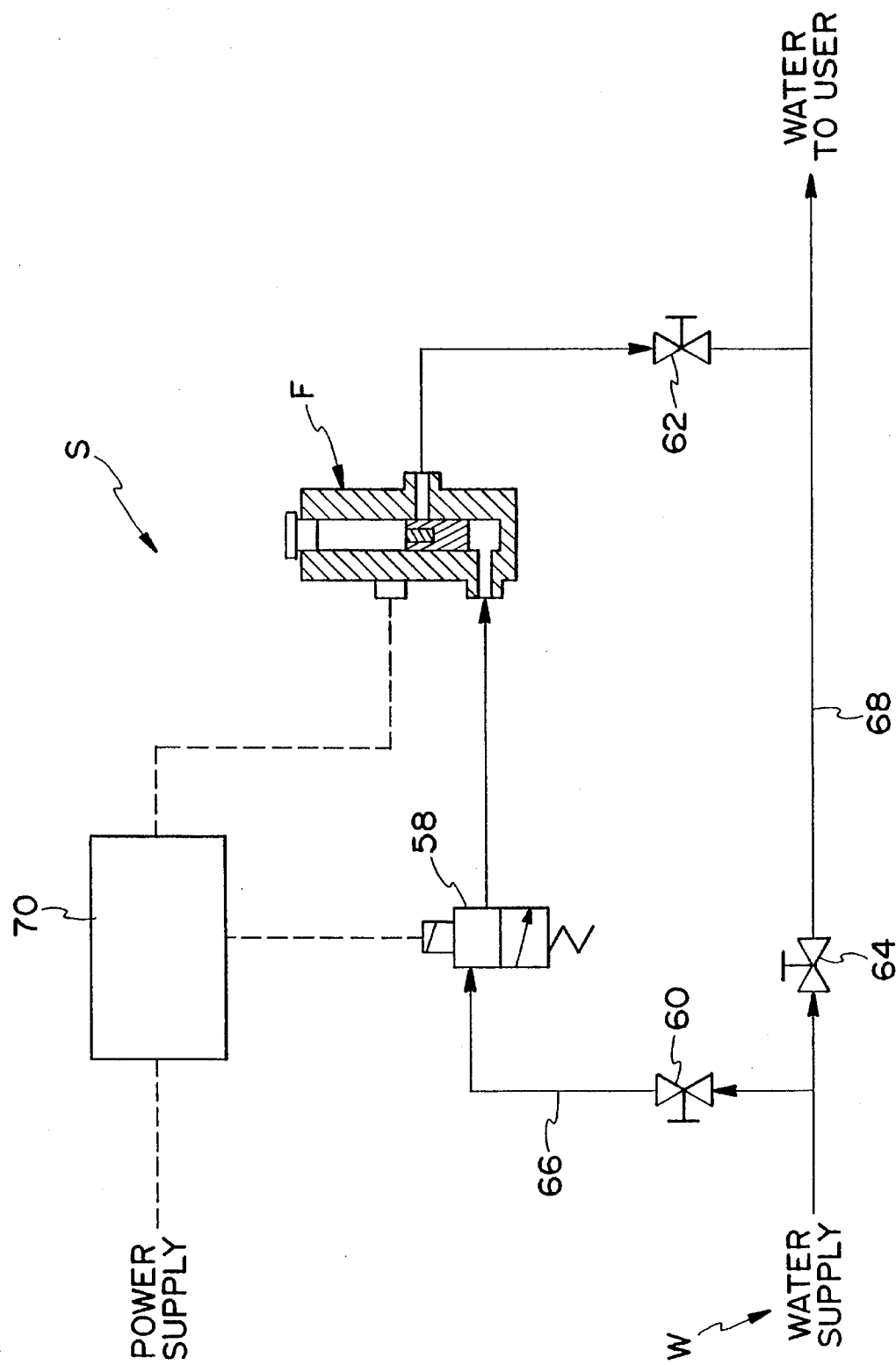
FIG. 8 is a schematic illustrating the preferred system setup of the present invention with the detector shown in cross section.

Referring to FIG. 8, system S shows the preferred configuration of the present invention. System S includes flow detector F, an electro-mechanical valve 58, three manual valves 60, 62, and 64, water line 66, bypass water line 68, and an electrical control unit 70.

Flow detector F is connected in series in water line 66 with electro-mechanical valve 58, both of which are coupled in series and intermediate to manual valves 60 and 62. Electrical control unit 70, which is described in greater detail below, is powered by 120 volts AC and interconnects flow detector F and electro-mechanical valve 58. If power supply is of the direct current type, a battery backup B is used for temporary operation of systems when there is a power outage (See FIG. 10).

A bypass water line 68 containing manual valve 64 is connected in parallel to water line 66.

System S is connected to and receives water from water supply W.

OPERATION OF THE SYSTEM

In operation, manual valve 64 is closed, thereby closing off water flow to bypass water line 68. Manual valves 60 and 62 and electro-mechanical valve 58 are set in the open position which allows water to flow through water line 66. As described above, when flow detector F detects water flow, switches 50 and 52 are actuated. Either or both of switches 50 and 52 when actuated, signal electrical control unit 70 that water flow is occurring. In response to the water flow, and after a predetermined time delay, electrical control unit 70 closes electro-mechanical valve 58 thereby preventing water flow in system S.

By closing manual valves 60 and 62 in water line 66, and opening manual valve 64 in bypass water line 68, electro-mechanical valve 58 and flow detector F can be uncoupled and removed from system S for easy repair and maintenance while still allowing water to flow uninterrupted to a user.

THE ELECTRICAL CONTROL

Figure 10:
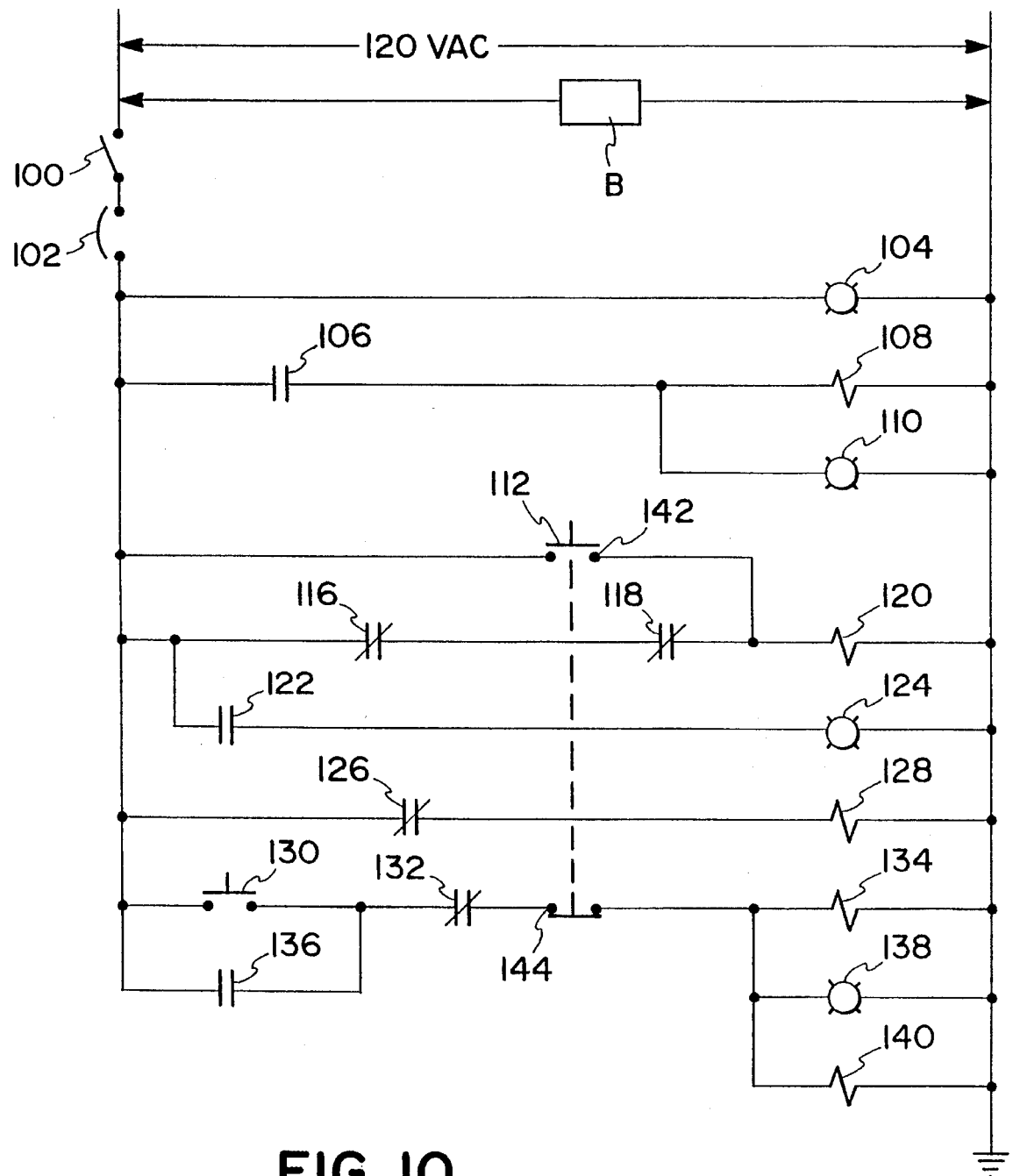
FIG. 10 an electrical schematic of the electrical control unit of the present invention.

Referring now to FIG. 10, there is shown a schematic diagram for the electrical control unit 70 shown in FIG. 8. Electrical control unit 70 includes a power switch 100 which turns power to electrical control unit 70 on and off. Circuit breaker 102 provides electrical protection in case of a short in the present invention.

System pilot light 104, when lit, indicates that electrical control unit 70 has power. When there is no power to electrical control unit 70, light 104 is off and electromechanical valve 58 will be in the closed position.

Contacts 106 represent the state of switches 50 and 52 in flow detector F. Contacts 106 are normally open when there is no water flow. When flow detector F detects water flow and switches 50 and 52 are actuated, contacts 106 will close and time delay relay 108 will be energized. Flow indicator light 110 then comes on indicating that contacts 106 are closed and that there is water flow.

Time delay relay 108 is a variable delay on energizing type relay. The timer period for time delay relay 108 starts timing when energized. The transfer of contacts 118 will take place, i.e. the relay 108 will actuate contacts opening them if closed, and closing them if open, if and when time delay relay 108 times out.

If water flow stops before time delay relay 108 times out, contacts 106 will open and time delay relay 108 will reset to zero time and no further action takes place.

If water flow continues beyond the interval set on time delay relay 108, contacts 118 will transfer. When transfer occurs, if contacts 116 are closed, indicating the override function is not in operation, the closure of contacts 118 will energize the coil of valve control relay 120 an impulse type, 2 position, maintain contact relay causing valve control relay 120 to transfer. As a result contacts 126 open which deenergizes and closes the electro-mechanical valve 128, turning off water flow, contacts 116 transfer turning power off to valve control relay 120 and contacts 122 transfer turning on valve off indicator light 124.

Valve control relay 120 is a pulse type relay that maintains its position until its coil is energized. It is arranged such that its coil is deenergized except for short pulses. The normally closed contacts of 126 are opened by the transfer of valve control relay 120. The only way to reverse valve control relay 120 is to press reset button 112. This energizes valve control relay 120 returning contacts 116, 122 and 126 to their normal position as shown.

Reset button 112 has two sets of contacts. The normally open contacts 142 close when reset button 112 is pressed. As described above, this energizes the coil of valve control relay 120. The normally closed contacts 144 reset the override timer 140 (described below) to nodal or off. If the override timer 140 was off when reset button 112 was pressed, there would be no change.

Override holding relay 134 is energized by pressing override button 130. When the coil of override holding relay 134 is energized its contacts transfer, closing normally open contacts 136 providing continuous power to the coil of override holding relay 134, and opening normally closed contacts 118. As long as contacts 118 remain open, valve control relay 120 will not be affected by closure of reed switch contacts 106 or the operation of time delay relay 108. Thus override holding relay 134 is held in an energized state until time delay relay 140 times out and its contacts 132 open to release override holding relay 134 back to normal.

Variable override delay timer 140 times from when override button 130 is pressed until its interval time period has run. Override delay timer 140 is a delay on energizing type timer. Its contacts, contacts 132, open to deenergize override holding relay 134, which in turn close contacts 118, allowing normal operation to take place.

Override pilot light 138 is lit when override button 130 has been pressed, indicating that override timer 134 is timing.

A optional backup power supply B such as a battery, can be used to allow system S to operate during power failure. In this case overall power supply and electrical control components must be of the direct current type and of the same voltage as the battery.

FLOW DIAGRAM

Figure 9:
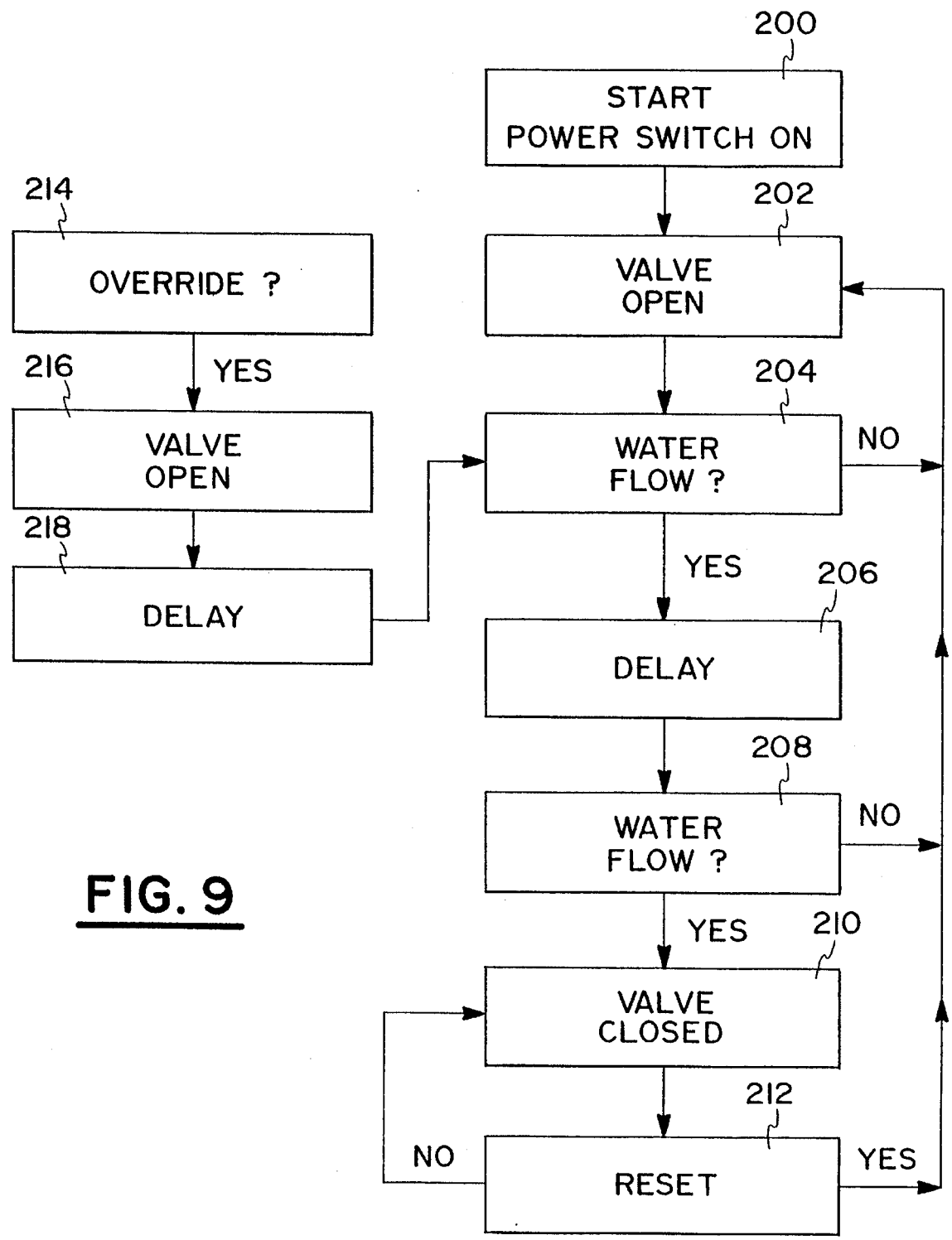
FIG. 9 is a flow chart representing the basic operation of the present invention.

FIG. 9 is a simplified flow diagram showing the basic operating steps of the present invention shown in FIG. 8. Logic begins as start block 200 which represents turning on power to electrical control unit 70.

Proceeding to block 202, electro-mechanical valve 58 is opened allowing water to flow through water line 66. If no water flows through water line 66, block 204 dictates return to Block 202 and electro-mechanical valve 58 remains in the open position. If water flow is detected in water line 66, block 204 proceeds to block 206 activating the delay timer in electrical control unit 70.

At block 208, if water flow in water line 66 stops before delay timer times out, block 208 dictates the return to block 202 keeping electro-mechanical valve 58 open. However, if water flow in water line 66 continues when delay timer times out, block 210 dictates that electro-mechanical valve 58 be closed, thereby preventing water flow in water line 66.

Block 212 determines if the reset switch has been pressed. If the reset switch is depressed, block 212 cycles the system back to block 202 where electro-mechanical valve 58 is opened resetting, the system to check for water flow. If the reset switch is not depressed, electro-mechanical valve 58 remains closed preventing any further water flow in water line 66.

Proceeding now to block 214. Block 214 determines if the override switch has been pressed. If it has, block 216 opens electro-mechanical valve 58, overriding the rest of the system. Block 218, maintains valve 58 in an open position for a preselected period of time. When the period of time has expired, the system resets back to block 204 checking for water flow in water line 66. The system could also be configured such that when override switch has been pressed, the delay timer is reset and starts to operate so that when the period of the override has expired, the valve will close immediately.

While this invention has been described as having a preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A water safety valve for detecting water flow due to leaks or breaks in a water line, comprising;
    a) a housing having a top, a bottom and an encompassing side wall;
    b) a central axial bore opening at said top and extending from said top toward said bottom and stopping a short distance from said bottom;
    c) an inlet port extending into said housing and opening into said central axial bore, said inlet port having a top and bottom;
    d) an outlet port in said side wall and opening into said central axial bore, said outlet port having a top and bottom;
    e) said outlet port spaced above said inlet port and below said top of said housing;
    f) a stop in said central axial bore adjacent said top of said inlet port;
    g) said central axial bore being of substantially uniform diameter from the top of said housing to adjacent the top of said inlet port;
    h) means for sealing said bore at the top of said housing;
    i) a piston of uniform diameter slidable within said central axial bore including a switch actuator, said piston having a top and a bottom and an encompassing side wall;
    j) switch means in said housing adjacent said top of said housing and actuatable by said piston;
    k) said piston having a length extending from said stop to a distance above said top of said outlet port;
    l) said piston when resting on said stop having its top spaced below said means for sealing said bore to form a first chamber between said piston top and said means for sealing said bore and a second chamber between said bottom of said piston and said bottom of said housing;
    m) a first fluid by-pass means in said piston extending from the top of said piston and exiting out of said piston side wall above said bottom of said piston and in substantial communication with said outlet port during slidable movement of said piston in said bore for moving fluid from said chamber into said outlet port;
    n) said piston having a clearance with said central axis bore of about between 0.003 and 0.006 inches;
    o) said piston having a non-switch actuating position at rest on said stop below said switch means, and a switch actuating position adjacent said switch means; and
    p) whereby when there is no water flow in said line, said piston will substantially close off said outlet port and when there is minimal water flow in said line, said piston will move upwardly discharging water from said chamber into said first fluid by-pass means and into said outlet port permitting said piston to rise to permit said actuator to actuate said switch means causing said water flow in said line to be shut down.

2. A device as recited in claim 1, wherein:
    a) said housing is one piece and generally cylindrical.

3. A device as recited in claim 1, wherein:
    a) said inlet port extends into said side wall of said housing.

4. A device as recited in claim 1, wherein:
    a) said piston is made of a generally non-corrosive material.

5. A device as recited in claim 4, wherein:
    a) said piston is brass.

6. A device as recited in claim 1, further comprising:
    a) a water line fitting in each of said inlet and outlet ports.

7. A device as recited in claim 1, wherein:
    a) said sealing means including a removable plug.

8. A device as recited in claim 1, wherein:
    a) said encompassing side wall of said housing having first and second groves;
    b) said first and second groves having a partition therebetween; and
    c) said switch means movably mounted to said partition adjacent said top of said housing.

9. A device as recited in claim 8, wherein:
    a) said first and second groves each extending from said top of said housing toward said bottom of said housing.

10. A device as recited in claim 1, wherein:
a) said switch means includes a first magnetically operated reed switch.

11. A device as recited in claim 10, wherein:
a) said switch means includes a second magnetically operated reed switch positioned in parallel with said first reed switch.

12. A device as recited in claim 11, wherein:
a) said switch actuator includes a magnet.

13. A device as recited in claim 1, and further comprising:
a) a piston anti-rotational means in said housing.

14. A device as recited in claim 13, wherein:
a) said piston anti-rotational means includes a slot extending from said top of said piston and stopping a short distance from said bottom of said piston; and
b) a pin set in said housing and extending into said central axial bore, said pin engagable with said slot.

15. A device as in claim 1, wherein:
a) said first fluid by-pass means including a slot in said side wall of said piston.

16. A device as recited in claim 1, further comprising:
a) a second by-pass means leading from said second chamber to said outlet port and including an adjustment means for controlling the flow of water through said second by-pass means from said second chamber to said outlet port.

17. A device as recited in claim 16, wherein:
a) said flow control adjustment means includes a needle valve.

18. A device as recited in claim 16, wherein:
a) said side wall of said housing includes an opening for receiving said flow control adjustment means.

19. A water safety system for detecting and shutting off water flow due to leaks or breaks in a water line, comprising:
a) a electro-mechanical first valve connected in the water line having an open and closed position, said first valve, when in said open position permits water to flow through the water line, and when in said closed position prevents water from flowing through the water line;
b) a flow detector having a sensor, said flow detector connected in the water line in series with said first valve for detecting water flow in the water line so that upon water flow detection, said sensor is actuated;
c) an electrical control unit connected to a power supply, said electrical control unit interconnecting said flow detector with said first valve, said control unit responsive to said flow detector detecting water flow;
d) said electrical control unit including a first variable delay timer for delaying for a first preselected period of time the closing of said first valve when said flow detector has detected water flow;
e) said electrical control unit having means for closing said first valve during water flow when said first preselected period has expired; and
f) said electrical control unit including a second variable delay timer for interrupting said first variable delay timer and maintaining said first valve in an open position for a second preselected period of time beyond said first preselected period of time.

20. A system as recited in claim 19, wherein:
a) said electrical control unit including a first reset for resetting said first variable delay timer when said second variable delay timer is activated.

21. A system as recited in claim 20, wherein:
a) said electrical control unit including a second reset for resetting said first variable delay timer when said second preselected period of time of said second variable delay timer has expired.

22. A system as recited in claim 21, further comprising:
a) a third reset for re-opening said first valve and resetting said first variable delay timer.

23. A system as recited in claim 22, further comprising:
a) manually controlled second and third valves, each having open and closed positions, said second and third valves coupled in series with said flow detector and said first valve, said flow detector and said first valve positioned intermediate said second and third valves; and
b) said second and third valves when in said closed position permits the uncoupling and removing of said flow detector and said first valve from the system.

24. A system as recited in claim 23, further comprising:
a) a by-pass water line connected in parallel with said flow detector and said first valve, said by-pass water line having a manually controlled fourth valve connected therein, said forth valve having open and closed positions, so that upon closing said second and third valves and uncoupling and removing said flow detector and said first valve and opening said fourth valve permits water to flow through said by-pass water line.

25. A system as recited in claim 19, further comprising:
a) an backup power supply connected to said electrical control unit.

26. A method for detecting and shutting off water flow due to leaks or breaks in a water line, comprising the steps of:
a) providing an electro-mechanical first valve having open and closed positions, connected in the water line;
b) providing a flow detector connected in the water line in series with the first valve for detecting water flow in the water line, the flow detector having a sensor;
c) providing an electrical control unit for interconnecting the flow detector with the first valve, said control unit responsive to the flow detector detecting water flow in the water line;
d) providing a first variable delay timer in the electrical control unit for delaying for a first preselected period of time the closing of the first valve when said flow detector has detected water flow;
e) providing the electrical control unit with a means for closing the first valve during water flow when said preselected period has expired;
f) opening the first valve to permit water to flow in the water line;
g) detecting water flow in the water line with the flow detector;
h) actuating the sensor in the flow detector;
i) activating the first variable delay timer in the control unit in response to the sensor being actuated;
j) closing the first valve during water flow when the first preselected period has expired to prevent water from flowing in the line; and
k) providing a second delay timer in the electrical control unit for interrupting the first delay timer for maintaining the first valve in an open position for a second preselected period of time beyond the first preselected period of time.

* * * * *